L. R. SNAPP.
VEHICLE BODY.
APPLICATION FILED APR. 9, 1918.

1,278,513.

Patented Sept. 10, 1918.
3 SHEETS—SHEET 1.

Inventor
LEONARD R. SNAPP

By Shigley & Harney
Attorneys

L. R. SNAPP.
VEHICLE BODY.
APPLICATION FILED APR. 9, 1918.
1,278,513.
Patented Sept. 10, 1918.
3 SHEETS—SHEET 2.
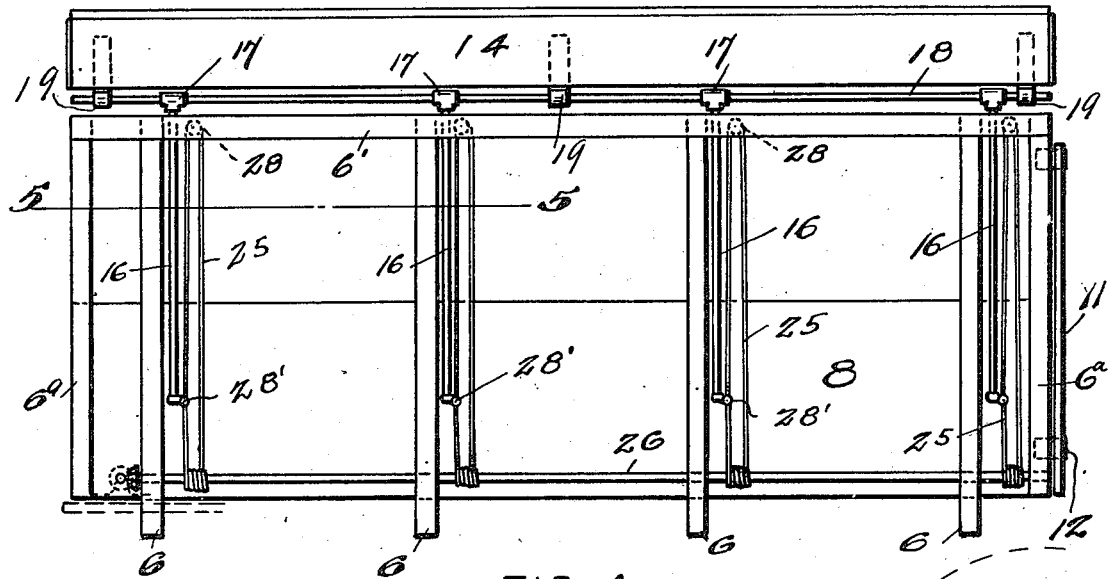
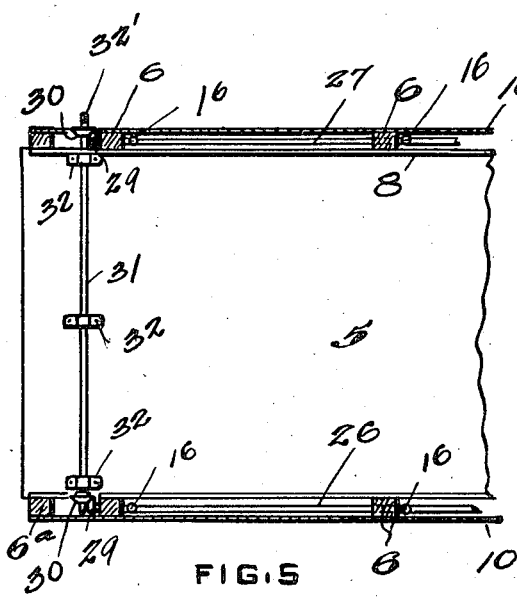
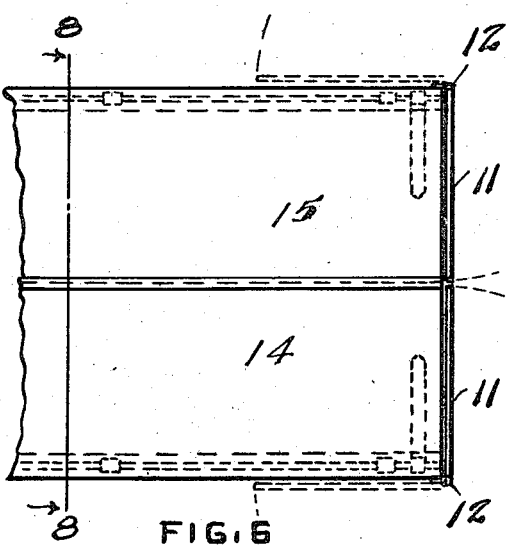
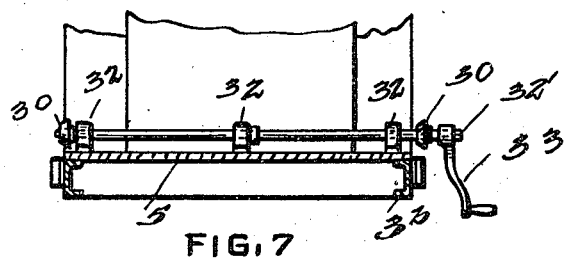
Inventor
LEONARD R. SNAPP
By Shigley & Harney
Attorneys

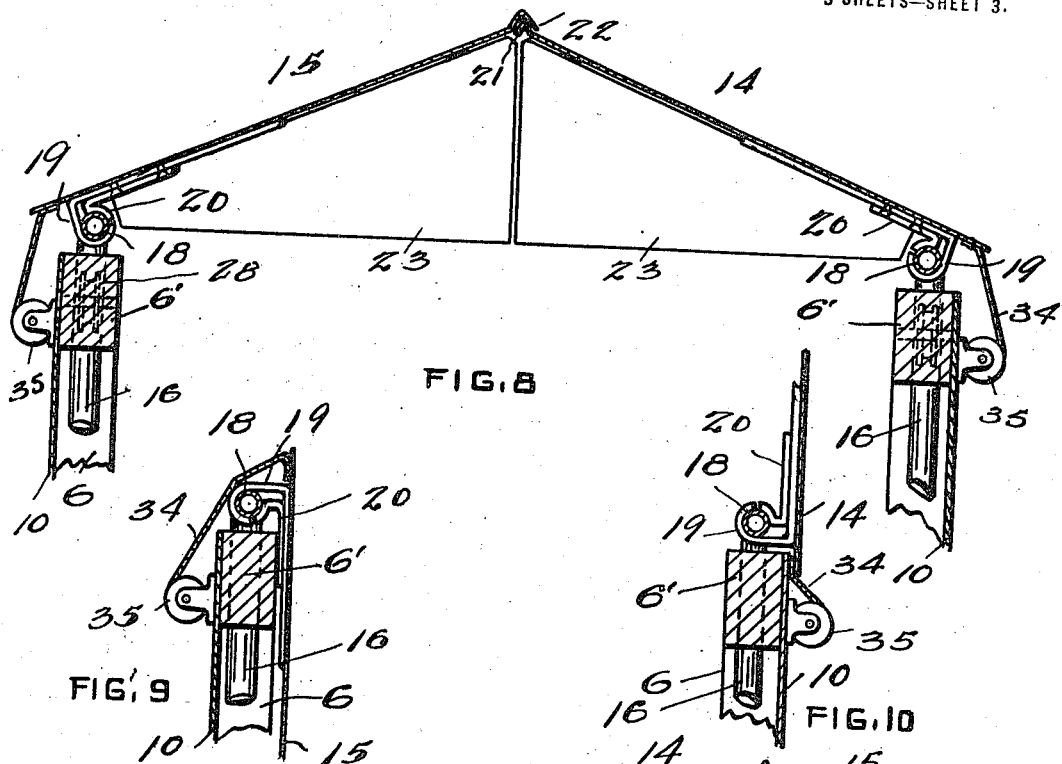

UNITED STATES PATENT OFFICE.

LEONARD R. SNAPP, OF COLUMBUS, OHIO.

VEHICLE-BODY.

1,278,513.  Specification of Letters Patent.  Patented Sept. 10, 1918.

Application filed April 9, 1918. Serial No. 227,457.

*To all whom it may concern:*

Be it known that I, LEONARD R. SNAPP, a citizen of the United States of America, residing at Columbus, in the county of Franklin and State of Ohio, have invented certain new and useful Improvements in Vehicle-Bodies, of which the following is a specification.

The present invention relates to improvements in vehicle bodies, designed particularly for use in connection with motor trucks, delivery wagons, and other similar types of vehicles. The primary object of the invention is the provision of a vehicle body that is readily attached or detached to or from the vehicle, and which involves constructions and arrangements of parts whereby the top is vertically adjustable in order to increase or decrease the interior storing capacity of the vehicle body, and further to provide novel forms of curtains and sides for the body to be used in conjunction with the adjustable top, which further embodies a novel combination of parts rendering it foldable so that it may be compactly stored when not to be used.

The invention consists essentially in certain novel combinations and arrangements of parts hereinafter set forth and claimed, and illustrated in the accompanying drawings which form a part of the application for patent.

In the accompanying drawings one complete example, showing several adaptations thereof, is illustrated, constructed and arranged according to the best mode so far devised for the practical application of the principles of the invention.

Fig. 4 is a side elevation of the vehicle body, detached from the vehicle frame.

Fig. 5 is a plan view of the vehicle floor, at its front end, showing also the side stanchions and posts in section as well as the outer side walls of the body.

Fig. 6 is a top plan view at the rear or tail end of the vehicle, showing the top, and indicating by dotted lines, the extent of the swing of the rear doors or end gates of the vehicle body.

Fig. 7 is a transverse sectional view through the body bottom and side beams of the frame, showing the actuating shaft for elevating the extensible top of the vehicle.

Fig. 8 is an enlarged sectional view at the top of the body at line 8 8 of Fig. 6.

Fig. 9 is a detail sectional view at the top edge of the sides of the body, showing a fragment of the top folded down within the interior of the body.

Fig. 10 is a similar view at the opposite side of the body with the top folded directly up in vertical position, leaving an open top body.

Fig. 11 is a diagrammatic view with the two top sections folded down within the interior of the body, as indicated in Fig. 9.

Fig. 12 is a diagrammatic view showing the extensible top elevated to its extreme capacity.

Fig. 13 is a diagrammatic showing of the top in extended position with the sections turned up to vertical position and forming extended side walls of the body.

Fig. 14 shows the body with the top sections turned down within the body, leaving, as in Fig. 13 an open top body.

Figure 1:
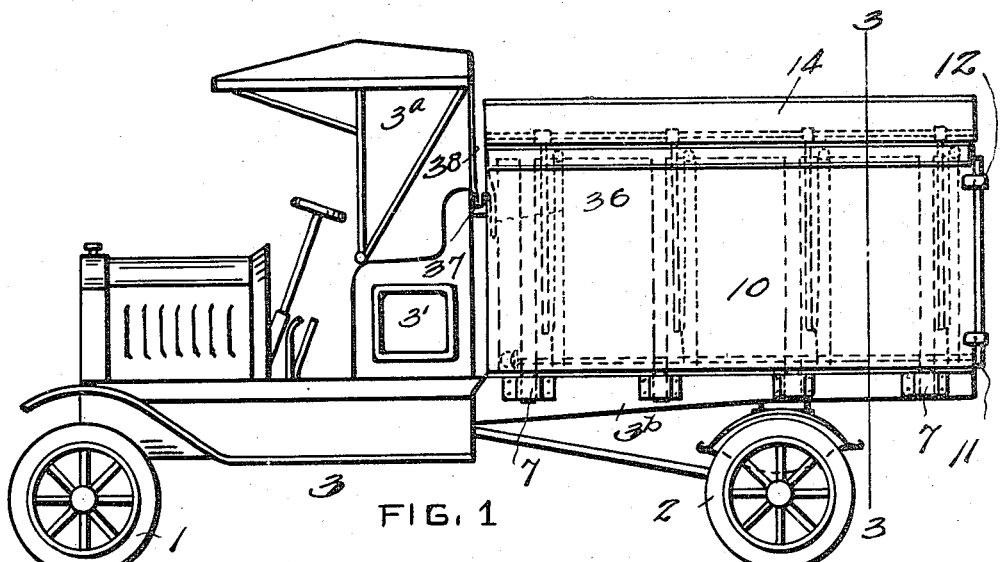
Figure 1 is a side elevation of a motor delivery truck or automobile embodying the novel form of body as contemplated in this invention.
Figure 3:
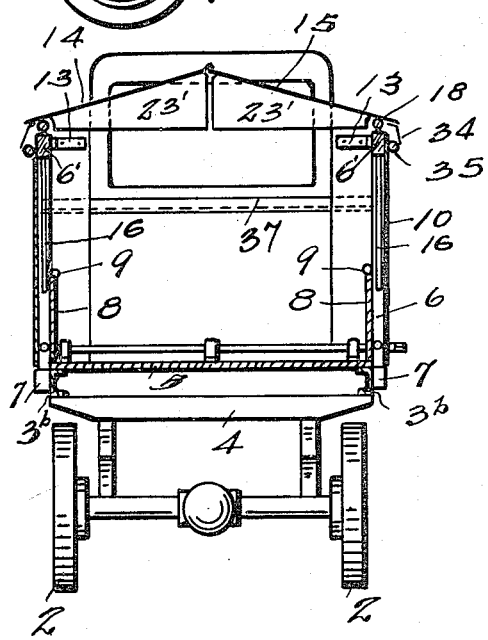
Fig. 3 is a transverse sectional view of the vehicle at line 3—3 of Fig. 1.
Figure 2:
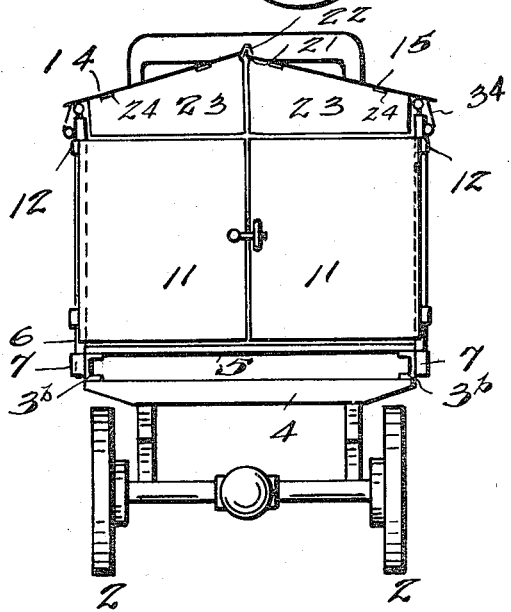
Fig. 2 is a rear end view of the vehicle.

In the preferred embodiment of the invention as illustrated in the drawings a motor delivery wagon or truck of usual standard type is utilized to show the application of the invention, the front and rear wheels being indicated respectively by the numerals 1 and 2 and the front body of the vehicle being designated as a whole as 3, this also including the driver's seat 3' and the "buggy top" or cover 3ª.

The side beams 3ᵇ of the under frame are supported on the bolsters 4, and the floor 5 of any suitable type or construction, is supported on the beams as usual. The sides of the body are equipped with stanchions 6 and end posts 6ª, and the stanchions are adapted to fit snugly within the sockets formed by the brackets 7 riveted or bolted to the sides of the side beams of the underframe, to hold the sides of the body erect above the bottom 5. At the upper ends of the stanchions and end posts the side rails 6' are located, extending longitudinally of the vehicle and having fastened thereto these posts and stanchions to form side frames for the body, and within the body the longitudinally extending wall 8, is hinged, as at 9, there being two of these walls, one at each side of the body and hinged about midway the height of the body, so that they may swing up, dotted lines Fig. 12, out of the way to give access to working parts of the device.

An exterior side wall, as 10 is also provided, extending throughout the height of the body side, and of course there are two of these side walls, which are fastened in suitable manner to the outer faces of the stanchions and posts as described. The end gates 11, 11, are hinged at 12, 12, at the rear of the body, and as shown by dotted lines in Fig. 6 they may be swung from transverse closed position to the dotted position of Fig. 6 where they lie parallel with the sides of the body, thus giving freedom for access to the interior of the body, not usually accompanying this style of vehicle.

The sides of the body, under usual conditions, may be held stationary and rigid in the brackets 7, but preferably additional means, as angle brackets 13 are employed, attaching the sides to the front portion of the superstructure of the truck or wagon, in order to form a rigid and stable support for the extensible top portion of the wagon body.

The top is in two distinct sections indicated as 14 and 15, and each of these sections has a supporting frame that is capable of adjustment, vertically with relation to the body of the vehicle to elevate or lower the top thus increasing or decreasing the interior area of the body. The adjustable frame for each top section embodies a series of vertically arranged, and spaced tubular standards or pipes 16, each connected at their upper ends by a T-coupling 17 with the piping 18 which forms a horizontally extending hinge bar, about which the two members 19 and 20 of each hinge, are adapted to swivel or turn. The style of hinge involving the use of the two straps has been adopted in order to give facility and despatch when removing the two top sections from the hinge bar, as it will readily be seen that by removing the straps 20 the top sections may be quickly disengaged from the hinge bars and the sections removed.

At their adjoining edges in the longitudinal center of the wagon body, the top sections are flanged as at 21 and 22 so that there is an overlapping joint at the peak of the top, and this joint not only prevents ingress of rain through the top but also supports and braces the two sections 14 and 15 at the edges as best shown in Fig. 8. At the rear, the top sections are each provided with a flap 23, hinged to the sections at 24, and these flaps fill in the space above the tail gates 11 11 of the body.

The standards 16 are passed through openings in the upper side rails 6' of the sides, and are located, each standard adjacent one of the stanchions and parallel therewith in order to give a stable support for the movable frames for the top sections. The frames are elevated, through the instrumentality of a series of endless cables 25 that are each wound around an elevating shaft 26 or 27 and, after passing over a sheave 28 journaled in the rail 6' the ends of the cables are attached as at 28' at the lower end of the standard as best shown in Fig. 4.

There are two of the elevating shafts as 26 and 27, extending longitudinally of the vehicle body and supported or journaled in the stanchions 6 and each provided with a bevel gear as 29 at the front end. These gears are engaged by similar gears 30 on the actuating shaft 31 which is also journaled as at 32 on the floor at the front end of the truck and extending transversely of the vehicle. One end as 32' projects sufficiently from the side of the vehicle to receive a crank handle 33 or other tool by which the actuating shaft may be turned, and it will readily be seen that the turning of the actuating shaft will raise, or permit to be lowered, the supporting frames for the top sections, thus elevating or lowering the top of the wagon body as desired.

When the top sections are elevated, the opening or gap between the upper edge of the sides 10 and the eaves of the top sections, is closed by means of a flexible curtain 34, one for each side of the truck, and these curtains are automatically wound, similar to window shade rollers, upon the spring rollers 35 that extend the full length of each side of the wagon body and are attached to the rails 6' at the upper edges of the sides. At the front of the body a similar flexible curtain 36 is hung and of sufficient length to permit raising of the top and at the same time closing the space between the elevated top section and the front body portion of the automobile. A gutter 37 is provided between the front body and the rear body portion of the vehicle, to receive the drippings from the buggy top curtain 38, and prevent ingress to the interior of the wagon body.

It will be noted that the entire body may be removed by withdrawing the stanchions from their sockets, and the actuating shaft and operating or elevating shafts are so related that the removal of the body merely disengages the two pairs of bevel gears 29—30, leaving the actuating shaft 31 on the floor of the flat truck, and if desired this shaft may then be utilized as a windlass with a rope or cable, or chain for drawing heavy bodies upon the truck in loading, etc.

The different adaptations for use of the body are clearly illustrated in the diagrammatic drawings, as where in Fig. 11 the minimum cubic capacity of the body is illustrated, and in Fig. 13 the maximum capacity is indicated, the two intermediate arrangements being exemplified in Figs. 12 and 14.

From the above description taken in connection with the drawings it is evident that a compactly arranged, simply constructed device is provided that may be changed with facility when required and that is comparatively perfect in performing the functions for which it is intended.

Claims:—

1. The combination with the vehicle side members including stanchions and upper rails, of frame beams having socket members to receive the stanchions and a floor on the beams, spaced standards movably supported in the rails at each side of the vehicle and upper hinge bars connecting the ends of the standards, a top section hinged on each bar, and means for elevating the standards.

2. The combination with the vehicle side members including stanchions and side rails, a series of spaced standards movably supported in each rail and a hinge bar connected to the upper ends of the standards of each series, a top section hinged on each bar, a pair of operating shafts and endless cables connected to said shafts and standards and a supporting sheave for each cable, and an actuating shaft for said operating shafts.

In testimony whereof I affix my signature.

LEONARD R. SNAPP.